Patented Feb. 13, 1940

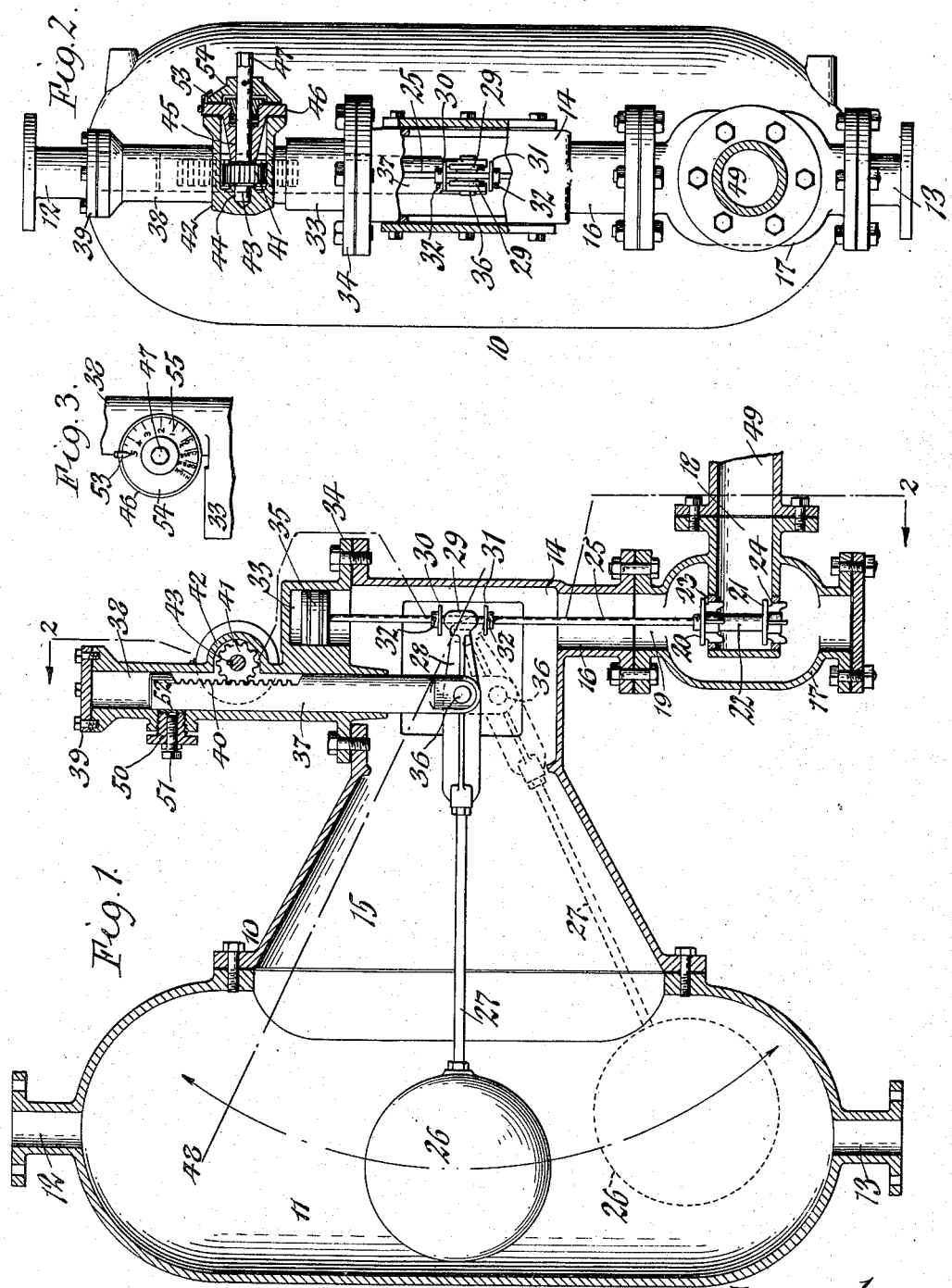

2,189,903

UNITED STATES PATENT OFFICE 2,189,903

LIQUID LEVEL CONTROL MECHANISM

Harlan W. How, Titusville, Pa., assignor to Struthers Wells-Titusville Corporation, Titusville, Pa., a corporation of Maryland Application May 21, 1937, Serial No. 144,025

1 Claim. (Cl. 137—68)

This invention relates to a liquid level control mechanism which is more particularly intended for use in connection with an evaporator of the pressure or vacuum type but the same may also be advantageously employed in other kinds of installations where it is necessary or desirable to maintain the liquid at a predetermined level.

In any evaporator it is desirable to change the level of the liquid to suit requirements or conditions. The means for effecting such change which have been employed heretofore necessitated shutting down the evaporator, removing a cover which closed an opening leading to the interior of the evaporator, and then reaching through this opening and adjusting the internal float mechanism which controlled the inlet valve of the liquid supply to suit the liquid level desired in the evaporator. These means naturally are very clumsy and also unsatisfactory due to the necessity of interrupting the operation of the evaporator whenever an adjustment of the liquid level control mechanism was required.

The liquid level in an evaporator often surges up and down due to uneven or unsteady operating conditions, such as varying steam pressure or varying vacuum in the liquor space, which surging, in the ordinary type of liquid level control mechanism, moves the float up and down several inches and thus opens and closes the liquid inlet valve with each rise and fall of the float, which action tends to accentuate the surging and causes unsatisfactory operation of the evaporator.

It is the object of this invention to provide a liquid control mechanism which avoids the above mentioned difficulties and with this end in view this invention consists generally of means whereby the adjustment of the float controlled valve mechanism may be effected from the exterior of the enclosing casing without requiring the evaporator to be shut down for this purpose, and interference with the operation of the liquid inlet valve is prevented by providing a slack connection between the float and the valve and providing retarding means whereby the valve is prevented from following slight fluctuations in the position of the float.

In the accompanying drawing:

Fig. 1 is a vertical longitudinal section of a liquid level control mechanism embodying one form of my invention.

Fig. 2 is a vertical transverse section of the same taken on line 2—2, Fig. 1.

Fig. 3 is a front view of an indicating means forming part of these improvements for determining the position of the valve mechanism from the exterior of the casing.

In the following description similar characters of reference indicate like parts in the several figures of the drawing.

The enclosing casing or housing 10 containing the liquid chamber of the liquid level control mechanism may be of any suitable form but, as shown in Figs. 1 and 2, the same preferably comprises an upright float chamber 11 provided at its upper and lower ends with upper and lower tubular connectors 12, 13 which are adapted to be connected with the interior space of the evaporator above and below the normal variation of the liquid level therein.

At one side of the float chamber is arranged an operating chamber 14 which is connected with the float chamber 11 by a hollow neck 15 which tapers from the float chamber to the operating chamber and connects the same so that the interior of the float chamber, operating chamber and neck practically form one liquid space in which the level of the liquid rises and falls during the operation of the apparatus.

On its underside the operating chamber is provided with a tubular inlet 16 for the admission of the liquid which is to be evaporated. The entrance of this liquid may be controlled by a valve of any suitable construction but preferably is of the balanced type and comprises a hollow body 17 having an inlet 18 at one side thereof which connects with a liquid supply and an outlet 19 which connects with the inlet 16 of the operating chamber, and two valve disks 20, 21 connected by a stem 22 and movable vertically in unison toward and from valve seats 23, 24 formed around ports in the valve body and leading from the upper and lower parts of the liquid inlet 18 to the internal space of the valve body, as shown in Fig. 1.

From the valve stem 22 a valve rod 25 extends upwardly through the outlet 19 of the valve body, the inlet 16 of the casing and into the operating chamber of the latter. This valve rod together with the parts connected therewith is adapted to be raised and lowered by a float mechanism for opening and closing the inlet valve in response to the variations in the level of the liquid in the casing, which float mechanism is preferably constructed as follows:

The numeral 26 represents a float which preferably has the form of a ball and which rises and falls with the level of the liquid in the float chamber. Motion is transmitted from this float to the valve rod by a float lever arranged horizontally in the casing and having a float arm 27 connected with the float and a shifting arm 28 which is operatively connected with the valve rod. This connection is of such character that a slight slack or lost motion is possible between the float lever and the valve rod and this is preferably accomplished by making the outer end of the float lever arm in the form of a fork which straddles the valve rod and providing each branch of this fork with a bearing head 29 the upper and lower sides of which are adapted to engage with upper and lower bearing collars 30, 31 secured to the adjacent part of the valve rod.

As the float rises with an increasing height of the liquid level in the casing the float lever is moved so that the lower sides of the bearing heads 29 engage with the lower collar 31 of the valve rod and move the latter downwardly whereby the control valve is closed when the liquid has risen to the predetermined level in the casing and no further liquid is admitted into the same. When the float descends in response to a lowering of the liquid level below the normal height then the float lever is moved in the opposite direction and the bearing heads on its shifting arm engage their upper sides with the upper collar 30 and raise the same together with the valve rod, whereby the control valve is opened and liquid is admitted to the casing for restoring the level of the same therein.

It has been found that the liquid level in the evaporator and the spaces connected therewith often surges due to uneven or unsteady operative conditions, such as varying steam pressure or varying vacuum in the liquid space.

This surging, with the ordinary type of liquid level control mechanism, moves the ball up and down several inches and closes and opens the control valve at comparatively short intervals during each rise and fall of the float and thus causes the inflow and stopping of liquid to alternate with such short frequency that surging of the liquid is accentuated and thus renders the operation of the evaporator unsatisfactory. To overcome this the means for transmitting the movement of the float to the valve are so organized that vibrations of the float which are of minor extent will not affect the control valve and only vibrations of major extent of the float will operate to move the valve into an open or closed position. This is preferably accomplished by making the heads 29 of the float lever narrower or of less height than the distance between the shifting collars 30, 31 so that a slight play exists between these heads and collars, as shown in Figs. 1 and 2. It will be obvious that this play or slack in the connection between the float lever and valve rod will permit the float to rise and fall independently of the valve rod to the extent of the difference between the height of the bearing heads and the distance between the shifting collars. The extent of this movement of the float independently of the valve is so determined that during ordinary short vibrations of the float which occur during a surge of the liquor in the evaporator will not move or affect the position of the valve but when the float moves upwardly or downwardly a considerable extent due to a marked rise or fall of the liquid level in the evaporator space then the bearing heads 29 of the float lever will engage either the upper or the lower collar on the valve rod and either open or close the valve accordingly.

For the purpose of enabling the extent of movement of the float independently of the control valve to be regulated to meet different conditions adjusting means are provided which preferably consist of set screws 32 whereby the shifting collars are secured to the valve rod at different distances from each other as best suits the conditions under which the evaporator is operating.

Retaining means are provided whereby the valve will be yieldingly held in this mean or mid-position between the extreme rise and fall of the surge of liquid in the evaporator so that this surge will not affect the valve. These retaining means preferably consist of a "dashpot" which includes an upright cylinder 33 arranged on the top cover 34 of the operating chamber 14, and a piston or plunger 35 connected with the upper end of the valve rod and reciprocating in said cylinder, as shown in Fig. 1. This piston is fitted more or less loosely in the cylinder of the dashpot so that the piston is permitted to move and the valve is opened or closed when there is definite change in the liquid level, but the valve will be held against any appreciable or substantial movement due to the surging effect on the float.

During its rocking movement the float lever turns on a horizontal fulcrum which in the present case consists of a pivot pin 36 passing transversely through the float lever. In the operation of an evaporator it sometimes is necessary or desirable to raise or lower this fulcrum for the purpose of raising or lowering the liquid level which is to be maintained in the evaporator. Heretofore this has been accomplished by means which were wholly within the casing of the float valve mechanism and this necessitated interrupting the operation of the apparatus and also dismantling parts of the same in order to gain access to the internal parts whereby this adjustment was effected.

The improved means for adjusting the fulcrum of the float lever are so organized that the same can be manipulated from the exterior of the casing and without removing any parts or stopping the operation of the evaporator for this purpose. As shown in Figs. 1, 2 and 3 the improved means for adjusting the fulcrum of the float lever vertically are constructed as follows:

The numeral 37 represents an upright fulcrum bar or rod the lower bifurcated end of which straddles the float lever and supports opposite ends of the fulcrum or pivot pin 36 while the upper part of the same is guided in an upright guideway 38 which preferably has the form of a tube opening at its lower end into the interior of the casing and is closed at its upper end by a cover or head 39. Upon raising or lowering this bar 37 the fulcrum 36 will be adjusted vertically, thereby raising or lowering the float and permitting the liquid to be maintained at different levels. If this fulcrum is raised the float will operate the control valve so as to raise the height of the liquid level in the evaporator and if this fulcrum is lowered the float will operate the control valve so as to lower the height of this liquid level.

The adjustment of the fulcrum 36 is effected by means which are accessible to the operator on the exterior of the casing and this may be effected by various means, but those shown in Figs. 1, 2 and 3 comprise an upright gear rack 40 arranged on one side of the fulcrum bar, a gear pinion 41 meshing with this rack and arranged within an internal pocket 42 on the adjustment part of the guide tube 38, and a horizontal adjusting spindle or shaft 43 connected with the gear pinion and journaled at its inner end in a bearing 44 on one side of the pocket 42 while its outer end is journaled in a bearing 45 on the opposite side of this pocket and extends to the outside of the same. The bearing 45 is formed on a cap or head 46 which closes the respective side of the pocket, and the outer end of the spindle is made hexagonal in cross section, as shown at 47 in Fig. 3, or of any other suitable form to permit of conveniently turning the same by a wrench or other tool.

Upon turning the spindle in one direction or the other the fulcrum of the float lever will be raised or lowered thereby enabling the liquid to be maintained at such level in the evaporator as best suits any particular condition. Inasmuch as this adjustment can be effected from the exterior of the apparatus without requiring dismantling of any of its parts, it is unnecessary to arrest the operation of the apparatus for this purpose with the added advantage that a quicker and more accurate and convenient adjustment of the liquid level can be obtained inasmuch as the response of the liquid level can be noted while the adjustment is taking place.

If for any reason it is desired to render this float controlling valve mechanism inoperative the inlet valve may be held in its open position by raising the fulcrum to its uppermost position, indicated by the center line 48 in Fig. 1, in which case the control of the liquid supply may be effected by a hand operated valve arranged in the pipe 49 which supplies the liquid to the control valve, and by shifting the fulcrum of the float lever to its lowermost position, as indicated by dotted lines in the same figure, the central valve will be held in its closed position. If it is desired to supply liquid to the evaporator while the float controlled valve is closed this may be done through a separate pipe containing a manually operated valve.

For the purpose of holding the fulcrum adjusting mechanism in place after the same has been shifted into the desired position locking or retaining means are provided which are preferably constructed as follows:

The numeral 50 represents a bushing which is screwed or otherwise secured in an opening in the side of the guide tube 38 and 51 represents a locking or set screw threaded in a longitudinal opening formed in this bushing. A slightly flexible metallic diaphragm 52 is arranged between the inner end of this bushing and the adjacent surface of the fulcrum bar and secured at its edge to the inner end of the bushing so as to form a sealed joint therebetween. Upon turning the locking screw in one direction the inner end of the same engages with the central part of this diaphragm or disk and deflects the same inwardly so that it presses against the fulcrum bar and holds the same against vertical displacement, but when this screw is turned in the opposite direction the pressure of the locking diaphragm 52 will be removed and the fulcrum bar will be released so that the same is free to be adjusted vertically in the guide tube. By these means the fulcrum for the float lever may be adjusted as required from the exterior of the casing which contains the active parts of the float valve mechanism and still prevent the leakage of any liquid into or out of the evaporator through the locking device and thus insuring proper operation of the apparatus.

Means are provided for indicating on the exterior of the apparatus the position of the fulcrum of the float lever and thus facilitate the setting of the same. In their preferred form these indicating means comprise a stationary pointer 53 secured to the cover or head 46, and a dial or indicating disk 54 secured to the spindle of the gear pinion and having an annular row of graduations 55 which are adapted to traverse the pointer and thus enable the operator to set the fulcrum of the float lever in any predetermined position.

I claim as my invention:—

A liquid level control mechanism comprising a casing containing a liquid space in which the liquid level is adapted to rise and fall and which is provided with a liquid inlet, a valve device for controlling said inlet, a float adapted to rise and fall with the liquid in said space, a valve rod connected with said valve device, a float lever operatively connecting said float with said valve rod, an upright tubular guideway arranged on said casing, a fulcrum bar slidable vertically in said guideway and having said lever pivoted thereto and provided within said guideway with a gear rack, a gear pinion meshing with said rack and having an operating spindle extending to the exterior of the casing, and means for locking said bar after the same has been adjusted including a bushing secured in an opening in the side of the guideway, a flexible disk secured to the inner end of said bushing and a set screw working in said bushing and having its inner end engaging said disk and pressing the same against said fulcrum bar.

HARLAN W. HOW.